July 1, 1930.  W. H. F. SCHMIEDING  1,768,636
SYSTEM OF ELECTRICAL DISTRIBUTION
Filed Feb. 28, 1927
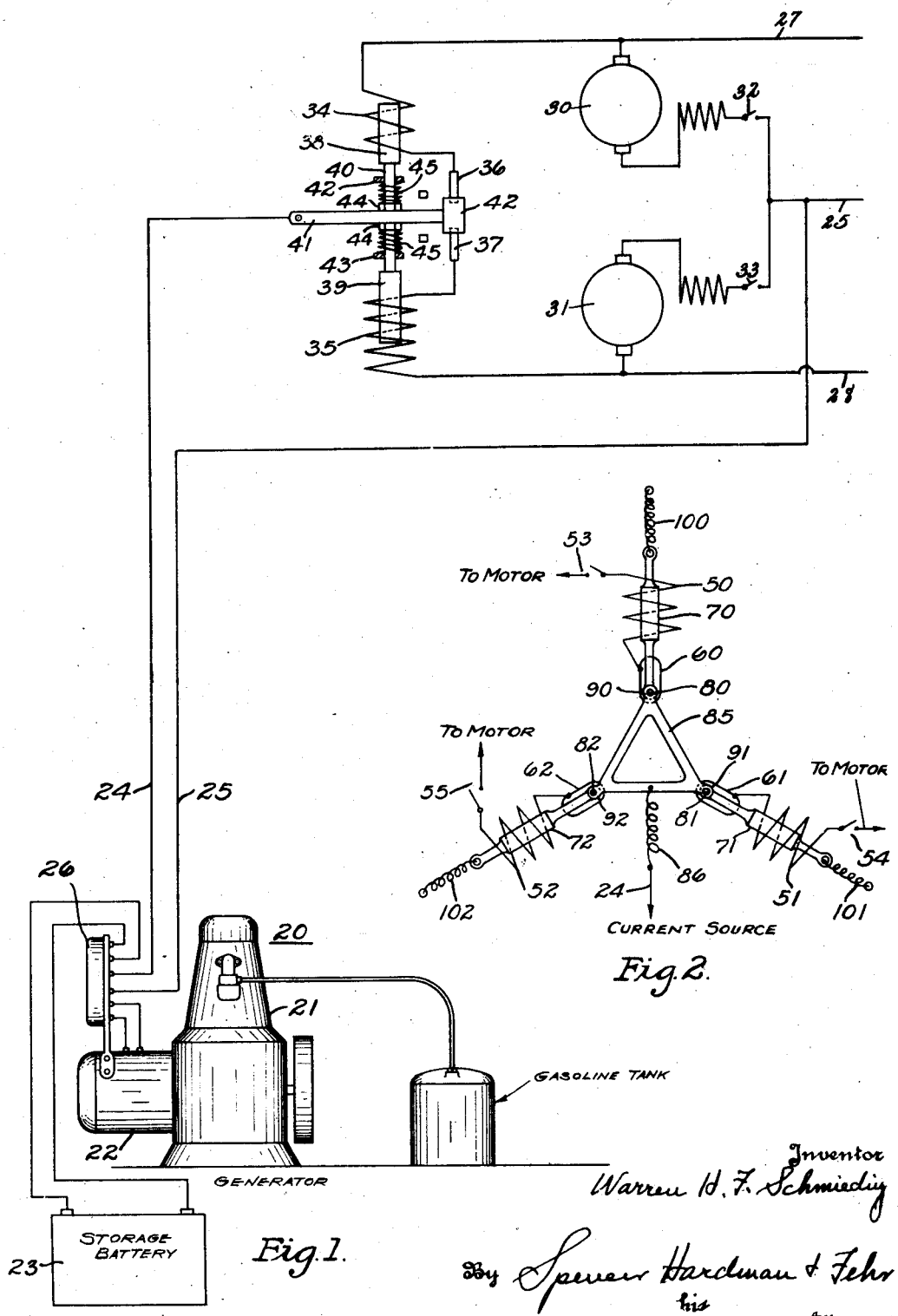

Patented July 1, 1930

1,768,636

UNITED STATES PATENT OFFICE

WARREN H. F. SCHMIEDING, OF DAYTON, OHIO, ASSIGNOR TO DELCO-LIGHT COMPANY, OF DAYTON, OHIO, A CORPORATION OF DELAWARE

SYSTEM OF ELECTRICAL DISTRIBUTION

Application filed February 28, 1927. Serial No. 171,588.

This invention relates to systems of electrical distribution, and more particularly to systems including small prime-mover-dynamo power plants and electrical translation devices, each of which consumes a relatively large part of the total wattage output of the plant.

One of the objects of the present invention is to protect the power plant from over-load by limiting the supply of current to the operation of only certain of the translation devices at any one time. In the present invention this object is accomplished by providing means responsive to the flow of the current to certain of the devices for preventing flow of current to other devices while maintaining the flow of current to the first mentioned devices.

Further objects and advantages of the present invention will be apparent from the following description, reference being had to the accompanying drawings, wherein a preferred embodiment of one form of the present invention is clearly shown.

In the drawing:

Fig. 1 is a wiring diagram illustrating the use of the present invention; and

Fig. 2 is a modified form of controller switch showing how the present invention may be applied to more than two electrical translation devices.

Referring to Fig. 1, 20 designates a prime-mover-dynamo plant including an engine 21 which operates a dynamo 22 for supplying current to a storage battery 23 or to a power line including the wires 24 and 25. The starting and stopping of the plant may be accomplished automatically through a controller mechanism 26, having a system of electromagnetically operated switches and relays which will cause the plant to start whenever there is a demand for a current in the power lines 24 and 25. The starting is accomplished by operating the dynamo 22 upon current from the storage battery 23. When the demand for current in the power lines 24 and 25 ceases, the plant will be stopped automatically. As this control does not of itself constitute a part of the present invention, the detailed construction of it is omitted. It may be a form of controller such as shown in the copending application of Ernest Dickey, Serial No. 84,841, filed January 30, 1926.

Fig. 1 shows a power circuit for supplying two work circuits, the wire 25 being common to both circuits and the other sides 27 and 28 of said work circuits each being connected with wire 24 through an automatic circuit controller and the other terminals connected respectively. This controller includes electromagnets 34 and 35 connected respectively with wires 27 and 28 and with stationary contacts 36 and 37. The magnets 34 and 35 co-operate with normally decentered solenoid armature plungers 38 and 39 respectively. These plungers are connected by a rod 40 with a movable contact lever 41 connected with the wire 24 and having a movable contact element 42. The rod 40 is supported for endwise movement by guides 42 and 43. Nuts 44 which are threadedly connected with a threaded portion of the rod 40, maintain the lever 41 in a certain position relative to the plungers 38 and 39. Springs 45, which are located between the nuts 44 and the guides 42 and 43 respectively, maintain the lever 41 normally in such position that the contact 42 will engage both of the contacts 36 and 37.

For the purpose of illustration, motor 30 is connected across work circuit 27—25 and motor 31 is connected across work circuit 28—25. These motors are controlled by switches 32 and 33 respectively and are herein described as being of such size so as to consume a relatively large part of the total wattage output of the dynamo 22. If the switch 32 is closed, current will flow from the current source, which may be a prime-mover-dynamo plant, or any other suitable current source, through the line 24, lever 41, contact 42, contact 36, coil 34, wire 27, motor 30, switch 32, wire 25 leading back to the current source. The magnet 34 being energized, the plunger 38 will be centered relative to the magnet and will cause the contact 42 to be separated from the contact 37 while being maintained in engagement with the contact 36; therefore the motor 31 cannot be operated by closing the switch 33. Similarly if the switch 33 is closed while switch 32 is open, current will flow from the current source through wire 24, lever 41, contact 42, contact 37, magnet coil 35, wire 28, motor 31, switch 33 and wire 25 leading to the current source. On being energized, the magnet 25 will attract the solenoid plunger 39 and will separate the contact 42 from contact 46 while contact 42 is maintained in engagement with the contact 37; therefore while motor 31 is being operated, the motor 30 cannot be operated.

It is to be understood that the illustration of motors of such capacity that will cause the operation of the automatic controller is merely for the purpose of readily understanding the invention and that a plurality of smaller current consuming translating devices may be connected in the work circuits, the construction being such that a predetermined current flow in the one work circuit will cause the other work circuit to be disconnected.

If the magnet coils 34 and 35 have the same number of ampere turns and both work circuits demand the same amount of current, as for example, if both motors utilized the same amperage and the switches 32 and 33 were closed simultaneously, lever 41 would not move to disconnect one of the circuits and it would be possible that neither circuit would receive adequate operating current. If it is desired to give work circuit 28—25 preference over circuit 27—25, the magnet coil 35 may be provided with more ampere turns than the magnet 34, in order that the magnet 35 may attract the solenoid plunger 39 against the pull exerted by the magnet 34.

It is therefore apparent that the present invention provides for limiting the generator output by preventing distribution to certain of the electrical translation devices which are included in the power circuit.

Fig. 2 shows how the invention may be extended to a circuit including more than two electrical motors. If for example, there are three motors or translation devices of relatively high current consumption in the power circuit, the automatic circuit controller will be provided with three electro-magnets 50, 51 and 52, arranged to exert magnetic attraction in three different directions and connected respectively with switches 53, 54 and 55 controlling respectively the translation devices. The magnet coils 50, 51 and 52 are connected respectively with stationary switch contacts 60, 61 and 62, which are elongated in the direction of the axes of the magnet coils with which they are respectively connected. Each of the coils 50, 51 and 52 are connected respectively with normally decentered solenoid armature plungers 70, 71 and 72, which are pivotally connected at 80, 81 and 82 respectively with a triangularly shaped movable switch contact member 85 connected by a flexible wire 86 with wire 24 connected with the current source. The contact member 85 carries contact buttons 90, 91 and 92 adapted to engage respectively with the stationary contacts 60, 61 and 62. The solenoid plungers 70, 71 and 72 are maintained normally decentered and the contact carrying element 85 is maintained in the position shown in Fig. 2 normally by springs 100, 101 and 102, which are connected respectively with the solenoid plungers 70, 71 and 72.

If the motor switch 53 is closed, current will flow through the magnet winding 50 and cause the solenoid plunger 70 to be centered, thereby causing the contact 90 to be pulled upwardly while remaining in engagement with the contact 60, and thereby causing the contacts 81 and 82 to be separated from the contacts 61 and 62, respectively. Thus the motor or translation device connected with switch 53 will receive current, but the devices connected with the switches 54 and 55 cannot be operated, although these switches are closed. It is therefore apparent that if switch 54 is closed while the other switches are open, the translation device connected with switch 54 can be operated to the exclusion of the devices connected with the switches 53 and 55. Similarly if switch 55 is closed while switches 53 and 54 are open, the device connected with switch 55 can be operated to the exclusion of the devices connected with the switches 53 and 54.

The present invention can be extended to systems of distribution including more than three current consuming devices by following the principles set forth herein. It will be noted that for each current consuming device there must be one electro-magnet and the controller must be constructed to operate the movable switch contact carrying element in as many different directions as there are circuits to be controlled. For example, if there were four circuits to be controlled, there would be four electro-magnets arranged preferably at 90 degrees so that the movable contact carrying element could be operated in four different directions. The stationary contacts, each of which is connected respectively with one of the electro-magnets, must be elongated in the direction of motion to the axis of the magnet and the contacts must be so arranged that motion of the movable contact carrying element into any one of the possible directions of motion will maintain only one circuit closed while interrupting the other circuits of the system of distribution.

While the form of embodiment of the present invention as herein disclosed, constitutes a preferred form, it is to be understood that other forms might be adopted, all coming within the scope of the claims which follow.

What is claimed is as follows:

An electrical system comprising, in combination, a plurality of power circuits adapted to supply current to translation devices, a generator for supplying current to said circuits, a plurality of individually operated switches for controlling the flow of current from the power circuits to the translation devices, means operated in response to a demand for current in excess of a predetermined amount in either of said power circuits for interrupting the other of said circuits, although the switch controlling the flow of current from the said other circuit to the translation device thereof is closed, and for reconnecting the said other circuit with the generator when the excess demand is removed from the first circuit.

In testimony whereof I hereto affix my signature.

WARREN H. F. SCHMIEDING.